United States Patent
Kawasaki et al.

(10) Patent No.: US 8,896,974 B2
(45) Date of Patent: Nov. 25, 2014

(54) THIN FILM MAGNETIC HEAD WITH SIDE LAYERS UNDER COMPRESSION STRESS

(71) Applicant: TDK Corporation, Tokyo (JP)

(72) Inventors: Shohei Kawasaki, Tokyo (JP); Shuji Okame, Tokyo (JP); Takayasu Kanaya, Tokyo (JP); Satoshi Miura, Tokyo (JP); Kenzo Makino, Tokyo (JP); Takumi Yanagisawa, Tokyo (JP); Takahiko Machita, Tokyo (JP); Masashi Sano, Tokyo (JP); Hideyuki Ukita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/853,293

(22) Filed: Mar. 29, 2013

(65) Prior Publication Data

US 2014/0293473 A1 Oct. 2, 2014

(51) Int. Cl.
*G11B 5/39* (2006.01)
*G11B 5/127* (2006.01)

(52) U.S. Cl.
CPC .................................... *G11B 5/3932* (2013.01)
USPC ...................................... 360/324.12; 360/319

(58) Field of Classification Search
None
See application file for complete search history.

(56) References Cited

U.S. PATENT DOCUMENTS

| | | | |
|---|---|---|---|
| 6,301,089 B1 * | 10/2001 | Saito et al. | 360/324.12 |
| 6,359,760 B2 * | 3/2002 | Kanno | 360/322 |
| 6,459,551 B1 * | 10/2002 | Hayakawa | 360/313 |
| 6,545,848 B1 * | 4/2003 | Terunuma | 360/324.12 |
| 7,221,546 B2 * | 5/2007 | Terunuma et al. | 360/324.12 |
| 7,330,339 B2 * | 2/2008 | Gill | 360/324.11 |
| 7,352,541 B2 * | 4/2008 | Gill | 360/324.12 |
| 7,365,948 B2 * | 4/2008 | Nakabayashi et al. | 360/324.1 |
| 7,463,459 B2 * | 12/2008 | Ding et al. | 360/324.12 |
| 7,466,524 B2 * | 12/2008 | Freitag et al. | 360/324.11 |
| 7,524,381 B2 * | 4/2009 | Thai et al. | 148/121 |
| 7,554,776 B2 * | 6/2009 | Hasegawa et al. | 360/324.11 |
| 7,616,411 B2 * | 11/2009 | Gill | 360/324.12 |
| 7,672,087 B2 * | 3/2010 | Kanaya et al. | 360/324.1 |
| 8,487,390 B2 * | 7/2013 | Dimitrov et al. | 257/421 |
| 2004/0165321 A1 * | 8/2004 | Hasegawa et al. | 360/324.11 |
| 2004/0228044 A1 * | 11/2004 | Hasegawa et al. | 360/324.1 |
| 2005/0190509 A1 | 9/2005 | Fox et al. | |
| 2005/0219770 A1 | 10/2005 | Gill | |
| 2005/0237676 A1 * | 10/2005 | Gill | 360/324.11 |
| 2005/0264951 A1 * | 12/2005 | Gill | 360/324.11 |
| 2007/0188938 A1 | 8/2007 | Gill | |
| 2008/0088987 A1 * | 4/2008 | Nakabayashi et al. | 360/324.11 |
| 2008/0239582 A1 | 10/2008 | Kanaya et al. | |
| 2012/0070693 A1 | 3/2012 | Abarra et al. | |
| 2012/0087045 A1 | 4/2012 | Yanagisawa et al. | |
| 2012/0087046 A1 | 4/2012 | Yanagisawa et al. | |
| 2012/0240390 A1 | 9/2012 | Degawa et al. | |
| 2012/0250189 A1 | 10/2012 | Degawa et al. | |

* cited by examiner

*Primary Examiner* — Brian Miller
(74) *Attorney, Agent, or Firm* — Posz Law Group, PLC

(57) ABSTRACT

A thin film magnetic head includes a spin valve film that includes a magnetization free layer, a magnetization pinned layer and a non-magnetic spacer layer that is disposed between the magnetization free and pinned layers, and a pair of side layers that are disposed at both sides of the spin valve film in a track width direction and at least in the vicinity of the magnetization free layer and the magnetization pinned layer. Each of the side layers has a bias magnetic field application layer that includes a soft magnetic layer and applies a bias magnetic field in the track width direction to the magnetization free layer, and a gap layer that is positioned between the spin valve film and the bias magnetic field application layer, and the side layers have compression stresses at least in the vicinity of the magnetization pinned layer.

15 Claims, 10 Drawing Sheets

THIN FILM MAGNETIC HEAD WITH SIDE LAYERS UNDER COMPRESSION STRESS

TECHNICAL FIELD

The present invention relates to a spin-valve type thin film magnetic head, and, especially, a configuration of side layers that include bias magnetic field application layers.

BACKGROUND

As a recording/reproducing head of a hard disk device, a thin film magnetic head that is made with a multilayer film is known. For a thin film magnetic head, in order to meet the advancement of high recording density, a current perpendicular to the plane (CPP)) element in which a sense current flows in the direction perpendicular to a film surface is used. As this type of element, a tunnel magneto-resistance (TMR) element utilizing a TMR effect and a CPP-giant magneto resistance (GMR) element utilizing a GMR effect are known.

As an example of a GMR element or a TMR element, an element provided with a spin-valve film (hereinafter SV film) is well-known. The SV film has a magnetization pinned layer of which a magnetization direction is pinned with respect to external magnetic fields, a magnetization free layer of which the magnetization direction changes according to external magnetic fields and a spacer layer that is positioned between the magnetization pinned layer and the magnetization free layer. The magnetization pinned layer is magnetized in the direction perpendicular to an air bearing surface. A bias magnetic field application layer is disposed at a side of a SV film to apply bias magnetic fields to the magnetization free layer. When the magnetization free layer is not affected by external magnetic fields, the magnetization free layer is magnetized by a bias magnetic field in the track width direction perpendicular to the magnetization direction of the magnetization pinned layer. In order to get good output and SN ratio, it is desirable that the external magnetic field is applied under such a state and the magnetization direction of the magnetization free layer rotates. Under the initial state, when the magnetization direction of the magnetization pinned layer doesn't correspond to the direction perpendicular to the air bearing surface, the output and the SN ratio get worse.

The magnetization direction of the magnetization pinned layer is fluctuated by various factors, especially by heat. A representative process from which the magnetization pinned layer receives heat is an annealing treatment in a wafer process. In recent years, while a high recording density of a magnetic disk is further advancing, in order to increase a recording density in the track width direction, the dimension of the SV film in the track width direction and the volume of the magnetization pinned layer tend to be reduced. In such a magnetization pinned layer with a small volume, the fluctuation of the magnetization direction easily becomes large under the high temperature environment.

In US 2008/0239582, in order to suppress the fluctuation of the magnetization direction of the magnetization pinned layer, a configuration is proposed. With the configuration, a product of a saturation magnetostriction constant of a magnetization pinned layer and an internal stress (a tensile stress is positive) of a pair of bias magnetic field application layers configured with a hard magnetic body is negative. When a pair of bias magnetic field application layers is maintained under the compression stress, the magnetization pinned layer sandwiched between these bias magnetic field application layers stretches in the direction perpendicular to the air bearing surface. The saturation magnetostriction constant is positive. Therefore, the magnetic field in the direction perpendicular to the air bearing surface is induced in the magnetization pinned layer, and the magnetization direction of the magnetization pinned layer is stabilized to the direction perpendicular to the air bearing surface.

When magnetic information is read from a magnetic disk that has a high recording density in the track with direction, the thin magnetic film head easily detects magnetic fields from bits adjacent in the track width direction to the bit that is the reading object. In order to solve such a problem, in US2012/0087045, US2012/0087046, and US2012/0250189, a configuration using a bias magnetic field application layer that includes a soft magnetic layer is proposed. The soft magnetic layer also functions as a magnetic shield (a side shield) to shield external magnetic fields. Therefore, the effect of magnetic fields from adjacent bits in the track width direction can be effectively suppressed.

However, under the high temperature environment, the stress state of the soft magnetic layer is easily changed. Even though an internal stress of a bias magnetic field application layer is a compression stress at the time of the film formation, the internal stress is easily changed into a tensile stress after the bias magnetic field application layer is put under the high temperature environment. When a pair of bias magnetic field application layers is under a tensile stress state, the magnetization pinned layer sandwiched between these bias magnetic field application layers shrinks in the direction perpendicular to the air bearing surface, and the magnetic field in the track width direction is induced. Therefore, the magnetization direction of the magnetization pinned layer becomes unstable.

The purpose of the present invention is to provide the thin film magnetic head that is provided with a spin-valve film that includes a magnetization pinned layer and side layers that include soft magnetic layers to apply bias magnetic fields, and in which the magnetization direction of the magnetization pinned layer of the thin magnetic head is stabilized in the direction perpendicular to the air bearing surface.

SUMMARY OF INVENTION

A thin film magnetic head of the present invention includes a spin valve film that includes a magnetization free layer of which a magnetization direction changes according to an external magnetic field, a magnetization pinned layer that has a positive saturation magnetostriction constant and of which a magnetization direction with respect to the external magnetic field is oriented to a direction perpendicular to an air bearing surface, and a non-magnetic spacer layer that is disposed between the magnetization free layer and the magnetization pinned layer; and a pair of side layers that are disposed at both sides of the spin valve film in a track width direction and at least in the vicinity of the magnetization free layer and the magnetization pinned layer. Each of the side layers has a bias magnetic field application layer that includes a soft magnetic layer and applies a bias magnetic field in the track width direction to the magnetization free layer, and a gap layer that is positioned between the spin valve film and the bias magnetic field application layer, and the side layers have compression stresses at least in the vicinity of the magnetization pinned layer.

The side layer has the compression stress at the side of the magnetization pinned layer. Therefore, the magnetization pinned layer is compressed in the track width direction by the side layers on both sides of the magnetization pinned layer and stretches in the direction perpendicular to the air bearing surface. The magnetization pinned layer has a positive saturation magnetostriction coefficient. Therefore, the magnetic field is induced in the direction perpendicular to the air bearing surface by the inverse magnetostriction effect, and the magnetic field of the magnetization pinned layer is stabilized in the direction perpendicular to the air bearing surface.

The above and other objects, features, and advantages will be disclosed by descriptions below that refer to attached figures illustrating the present invention.

DETAILED DESCRIPTION OF THE INVENTION

In the following, referring to the figures, various embodiments of the present invention are explained. In the following explanations, in order to define the direction of the thin film magnetic head, terms of "Track width direction T," "Lamination direction P" and "Height direction H" are used. "Track width direction T" means a width of a track concentrically formed on a round-shaped recording medium, that is, a radius direction of the recording medium. "Lamination direction P" is a direction in which many films to configure a SV film are laminated, a direction parallel to a line connecting a leading side and a trailing side of the thin film magnetic head, and a direction perpendicular to the thin film magnetic head formation surface Wa of a wafer W (refer to FIG. 1). "Height direction H" is a direction perpendicular to the air bearing surface. "Track width direction," "lamination direction" and "height direction" are equivalent to x-direction, y-direction and z-direction of three-dimension perpendicular coordinate, and are perpendicular to each other.

Also, in the following explanations, terms of "parallel" and "antiparallel" are used. "Parallel" means that two directions are oriented to a same angle direction, and "antiparallel" means that two directions are oriented to angle directions that are different by 180 degrees from each other.

Also, in the following explanation, oxides are listed by a stoichiometry composition but not necessarily limited to the compositions. Regarding metal alloy compounds, specific composition ratios are not often referred. Therefore, they are written as placing symbols of elements in a line such as "CoFe," "NiFe" or "CoFeB," and the composition ratios specified. When the specific composition ratios are referred in the embodiments, it is written accompanied by at % at right lower side of the symbol of elements. An example thereof is "$Co_{90}Fe_{10}$."

First Embodiment

Figure 1:
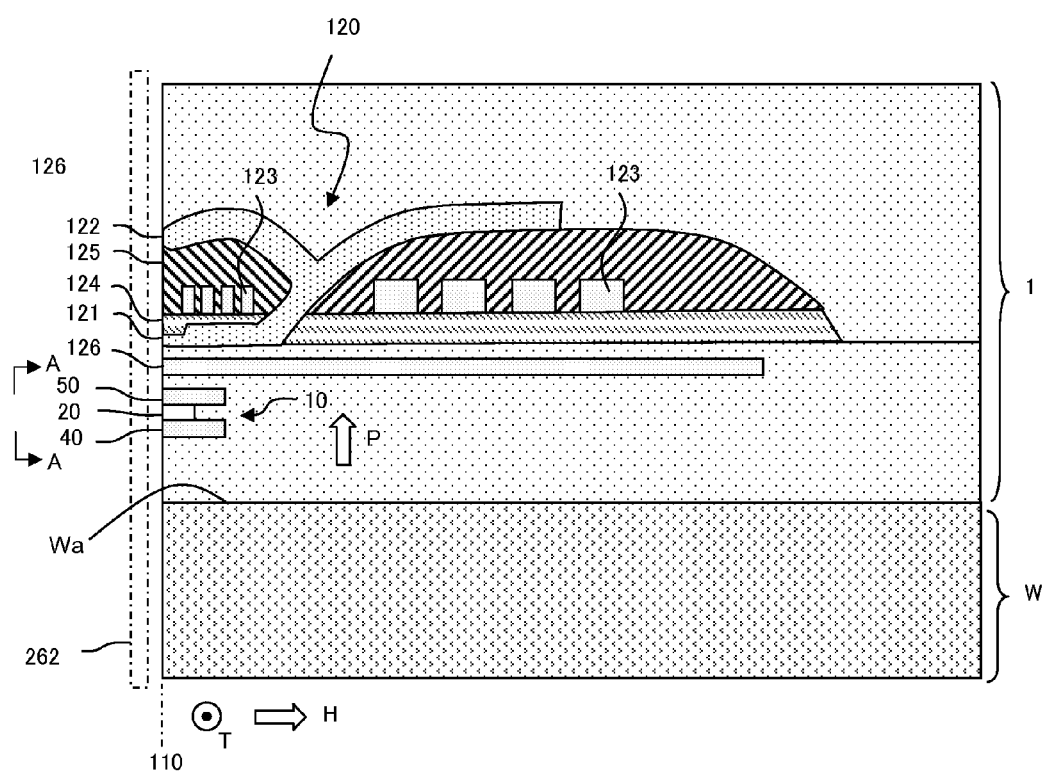
FIG. 1 is a schematic sectional view of a thin film magnetic head in the present invention.

FIG. 1 is a schematic sectional view of a thin film magnetic head with respect to the first embodiment in the present invention. A thin film magnetic head 1 is a composite type head formed on a wafer W having a reproducing element 10 and a writing element 120. Instead of this, the thin film magnetic head may be a head having only the reproducing element 10, which is only for reproducing.

Figure 2:
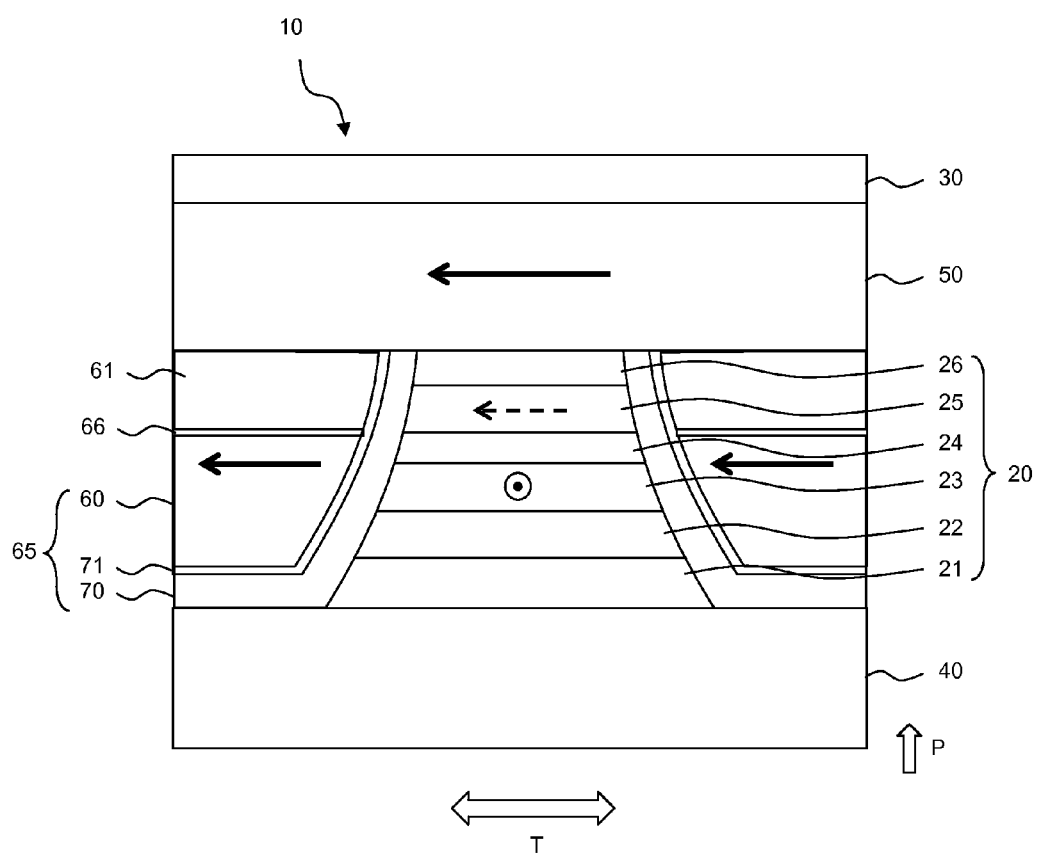
FIG. 2 is a schematic plan view of a reproducing element of a thin film magnetic head with respect to the first embodiment.

FIG. 2 is a schematic plan view of the reproducing element 10 of the thin film magnetic head 1 with respect to the first embodiment, viewed from the A-A direction of FIG. 1, that is, an air bearing surface (ABS) 110. Here, the air bearing surface 110 is a surface of the thin film magnetic head 1, which faces a recording medium 262. The arrows in the figure show the magnetization directions of layers. The dotted arrow shows the direction of a bias magnetic field applied to a magnetization free layer 25. The double circle symbol marked at the center of a magnetization pinned layer 23 shows that the magnetization pinned layer 23 is magnetized in the direction perpendicular to the paper (height direction H).

The reproducing element 10 has a SV film 20 of which the electrical resistance is changed according to external magnetic fields. The SV film 20 is arranged to face the recording medium 262, and one side of the SV film 20 faces the ABS110.

At both sides of the SV film 20 in the lamination direction P, a pair of shields, that is, a lower shield layer 40 and an upper shield layer 50, is disposed. The upper shield layer 50 covers a pair of side layers 65 and the SV film 20 and is magnetized in the track width direction T. For the lower shield layer 40 and the upper shield layer 50, a magnetic layer made of NiFe, CoFe, NiCoFe, FeSiAl or the like can be used.

The lower shield layer 40 and the upper shield layer 50 also function as an electrode to flow a sense current in the lamination direction P by applying voltages to the SV film 20. The magnetic field from the recording medium 262 at the position facing the SV film 20 is changed by the movement of the recording medium 262. The SV film 20 detects this change of the magnetic field as a change of an electrical resistance. Thereby, the thin film magnetic head 1 reads magnetic information written on each bit of the recording medium 262.

Regarding the pair of side layers 65, the side layers 65 respectively have bias magnetic field application layers 60 and gap layers 70. A pair of bias magnetic field application layers 60 (reference number 60 is given only to the bias magnetic field application layer on left side in FIG. 2) is disposed at both sides in the track width direction T of the SV film 20. Each of the bias magnetic field application layers 60 includes a soft magnetic layer 61 magnetically connecting to the upper shield layer 50. In this specification, "magnetically connect" means that two magnetic layers contact each other or that, when one of the magnetic layers is magnetized in an intended direction, the other magnetic layer is also magnetized in an intended direction by a magnetic mutual influence. Here, magnetization generated in one of the magnetic layers and magnetization generated in the other magnetic layer may be oriented in either a parallel direction or an antiparallel direction. The pair of bias magnetic field application layers 60 is disposed at least in the vicinity of the magnetization free layer 25 to effectively apply the bias magnetic field in the track width direction T to the magnetization free layer 25. In this embodiment, the pair of side layers 65 sandwiches the magnetization free layer 25 in the track width directions T. Also, as mentioned later, the pair of side layers 65 is disposed at least in the vicinity of the magnetization pinned layer 23 to give compression stress to the magnetization pinned layer 23. In this embodiment, the pair of side layers 65 sandwiches the magnetization pinned layer 23 in the track width direction T. As being different from this embodiment, even when layers under the magnetization pinned layer 23 have widths in the track width direction T, the widths being sufficiently wider than that of the magnetization free layer 25 in the track width direction T, by the side layer 65 facing the magnetization pinned layer 23 in the vicinity of the magnetization pinned layer 23, the side layer 65 can give the compression stress to the magnetization pinned layer 23.

In this embodiment, the bias magnetic field application layer 60 is made with only the soft magnetic layer 61 that magnetically connects to the upper shield layer 50, and the soft magnetic layer 61 contacts the upper shield layer 50. The upper shield layer 50 may be formed with either a different material from that of the bias magnetic field application layer 60 or the same material. When the upper shield layer 50 is formed with the same material as that of the bias magnetic field application layer 60, the upper shield layer 50 and the bias magnetic field application layer 60 may be integrally configured.

Between the SV film 20 and the bias magnetic field application layer 60 and between the lower shield layer 40 and the bias magnetic field application layer 60, a gap layer 70 is disposed. The gap layer 70 is disposed to contact the SV film 20 and prevents the sense current from flowing between the bias magnetic field application layer 60 and the SV film 20, and flowing into the lower shield layer 40 from the bias magnetic field application layer 60. The gap layer 70 can be formed with $Al_2O_3$, $SiO_2$, GaO, MgO or the like. Especially, as mentioned later, not only after the film formation but also after the annealing treatment, MgO can hold a high compression stress. Therefore, MgO can be suitably applied for the present invention. Between the soft magnetic layer 61 and the gap layer 70, a seed layer 71 may be disposed. The seed layer 71 is made by laminating or alloying one, two or more materials selected from, for example, Ta, Ru, Hf, Nb, Zr, Ti, Mo, Cr and W.

At the surface of the upper shield layer 50, the surface being on the side opposite to the SV film 20, an anisotropy application layer 30 is disposed. The anisotropy application layer 30 magnetizes the upper shield layer in the track width direction T by giving exchange-anisotropy to the upper shield layer 50. For the anisotropy application layer 30, an antiferromagnetic layer such as IrMn, PtMn, RuRdMn, FeMn or the like, or a hard magnetic layer such as CoPt, CoCrPt, FePt or the like can be used.

The soft magnetic layer 61 of the bias magnetic field application layer 60 magnetically connects to the upper shield layer 50. Therefore, the soft magnetic layer 61 is magnetized in the track width direction T, which is more specifically, in the direction parallel to the upper shield layer 50. By being magnetized in the track width direction T, the soft magnetic layer 61 obtains a function to apply a bias magnetic field in the track width direction T to the SV film 20, especially to the magnetization free layer 25.

The soft magnetic layer 61 of the bias magnetic field application layer 60 magnetically connects to the upper shield layer 50. Therefore, the magnetic field applied to the soft magnetic layer 61 is absorbed by the upper shield layer 50 via the soft magnetic layer 61. In this way, the magnetic fields applied to the both sides of the SV film 20 in the track width direction T are effectively absorbed by the bias magnetic field application layer 60 and the upper shield layer 50. Thereby, the function to shield the magnetic fields applied to the both sides of the SV film 20 in the track width direction T can be obtained.

The magnetic fields applied to the both sides of the SV film 20 in the track width direction T are absorbed not only by the bias magnetic field application layer 60 but also by the upper shield layer 50. Therefore, the change of the magnetization direction in the bias magnetic field application layer 60 is small. Thereby, even under the state that the external magnetic field is applied, the bias magnetic field application layer 60 can substantially apply the bias magnetic field to the magnetization free layer 25.

For the SV film 20, arbitrary configurations provided with the magnetization free layer 25 and the magnetization pinned layer 23 can be used. In this embodiment, the SV film 20 is disposed on the lower shield layer 40 with the thickness of about 1 μm. The SV film 20 is a multilayer film in which a buffer layer 21, a pinning layer 22, the magnetization pinned layer 23, a spacer 24, the magnetization free layer 25, and a cap layer 26 are sequentially laminated on the lower shield layer 40 in this order.

The buffer layer 21 is disposed as a seed layer of the pinning layer 22. As the buffer layer 21, a single-layer film such as Ta, Ru, NiFe, NiCr or the like, or a multilayer film of them can be used. The pinning layer 22 is disposed to pin the magnetization direction of the magnetization pinned layer 23. As the pinning layer 22, an antiferromagnetic layer such as IrMn, PtMn, RuRdMn, FeMn or the like can be used.

The magnetization pinned layer 23 is a single magnetic layer of which the magnetization direction is pinned with respect to the external magnetic field in this embodiment. However, it can be a lamination film in which multiple magnetic layers are laminated sandwiching an antiferromagnetic exchange coupling layer. For example, as the magnetization pinned layer 23, a multilayer film in which a CoFe layer of which the magnetization direction is pinned, a Ru layer that is an antiferromagnetic exchange-coupling layer and a CoFe layer of which the magnetization direction is pinned are laminated in this order, can be used. Instead of Ru, Cu or Rh can also be used. The magnetization pinned layer 23 configured with the lamination film includes multiple magnetic layers of which the magnetic directions are mutually antiparallel. In this case, the magnetization direction of the magnetization pinned layer 23 showed in the illustration shows the magnetization direction of the magnetic layer directly under the spacer 24. The magnetization pinned layer 23 has a positive magnetostriction coefficient. Having a positive magnetostriction coefficient means that, when the magnetization pinned layer 23 is stretched in a direction, the magnetic field is induced in the stretched direction.

The magnetization free layer 25 is a ferromagnetic layer of which the magnetization direction is changed according to the external magnetic field. As the magnetization free layer 25, a multilayer film of CoFe and NiFe can be used. The bias magnetic field is applied from the bias magnetic field application layer 60 to the magnetization free layer 25 so as to orient its magnetization direction to the track width direction T when there is no external magnetic field. The magnetization direction of the magnetization free layer 25 rotates in the plane of the magnetization free layer 25 according to the external magnetic field and makes an angle with respect to the magnetization direction of the magnetization pinned layer 23. According to the angle between the magnetization direction of the magnetization free layer 25 and the magnetization direction of the magnetization pinned layer 23, the electrical resistance of the SV film 20 changes. The thin film magnetic head 1 reads magnetic information of the recording medium by detecting the change of electrical resistance.

The spacer 24 is disposed to separate the magnetization free layer 25 from the magnetization pinned layer 23. For the spacer 24, various materials such as Cu, $Al_2O_3$, MgO, Ag, Cr, ZnO, and GaO, mixed materials made of them or the like, can be used. It is preferable for the spacer to be a nonmagnetic layer but not limited to be a nonmagnetic layer.

The cap layer 26 is disposed to prevent the deterioration of the laminated layers. As the cap layer 26, a multilayer film of Ru, Ta or the like is used. On the cap layer 26, the upper shield layer 50 is formed.

Second Embodiment

Figure 3:
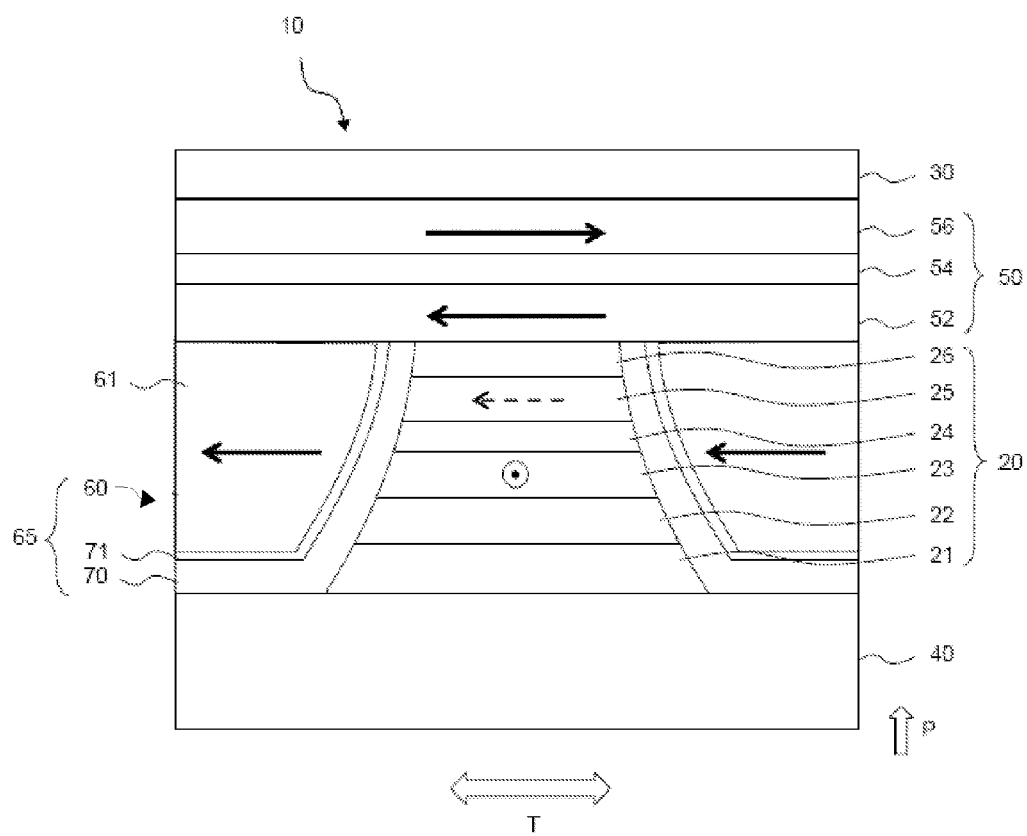
FIG. 3 is a schematic plan view of a reproducing element of a thin film magnetic head with respect to the second embodiment.

FIG. 3 is a schematic plan view of the reproducing element 10 of the thin film magnetic head 1 with respect to the second embodiment, viewed from ABS110. In this embodiment, the upper shield layer 50 is made with a magnetic coupling layer 54 and two soft magnetic layers. The two soft magnetic layers are first and second soft magnetic layers 52 and 56. The magnetic coupling layer 54 is positioned between the first soft magnetic layer 52 and the second soft magnetic layer 56 and makes the first soft magnetic layer 52 exchange-couple with the second soft magnetic layer 56. The magnetic coupling layer 54 is made with a nonmagnetic layer of, for example, Ru, Rh, Cr, Cu, Ag or the like. The bias magnetic field application layer 60 magnetically connects to the first soft magnetic layer 52 of the upper shield layer 50. The upper shield layer 50 may have a configuration in which three or more layers of soft magnetic layers are provided and the magnetic coupling layers are respectively disposed between adjacent two soft magnetic layers. Other configurations are same as the first embodiment.

Third Embodiment

Figure 4:
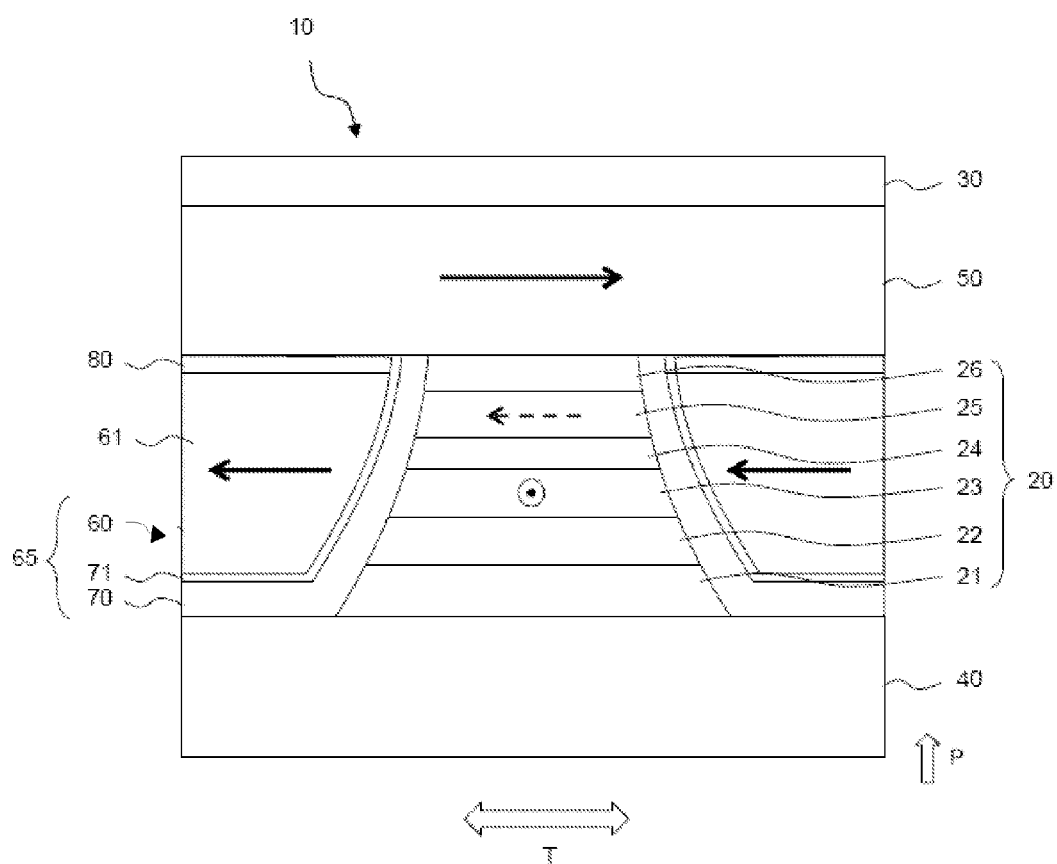
FIG. 4 is a schematic plan view of a reproducing element of a thin film magnetic head with respect to the third embodiment.

FIG. 4 is a schematic plan view of the reproducing element 10 of the thin film magnetic head 1 with respect to the third embodiment, viewed from the ABS110. In this embodiment, the bias magnetic field application layer 60 including a soft magnetic layer exchange-couples with the upper shield layer 50 via a magnetic coupling layer 80. The magnetic coupling layer 80 is made with a nonmagnetic layer of, for example, Ru, Rh, Cr, Cu, Ag or the like. The bias magnetic field application layer 60 magnetically connects to the upper shield layer 50. However, as being different from the first embodiment, it is magnetized in the direction antiparallel to the upper shield layer 50. Other configurations are same as the first embodiment.

Fourth Embodiment

Figure 5:
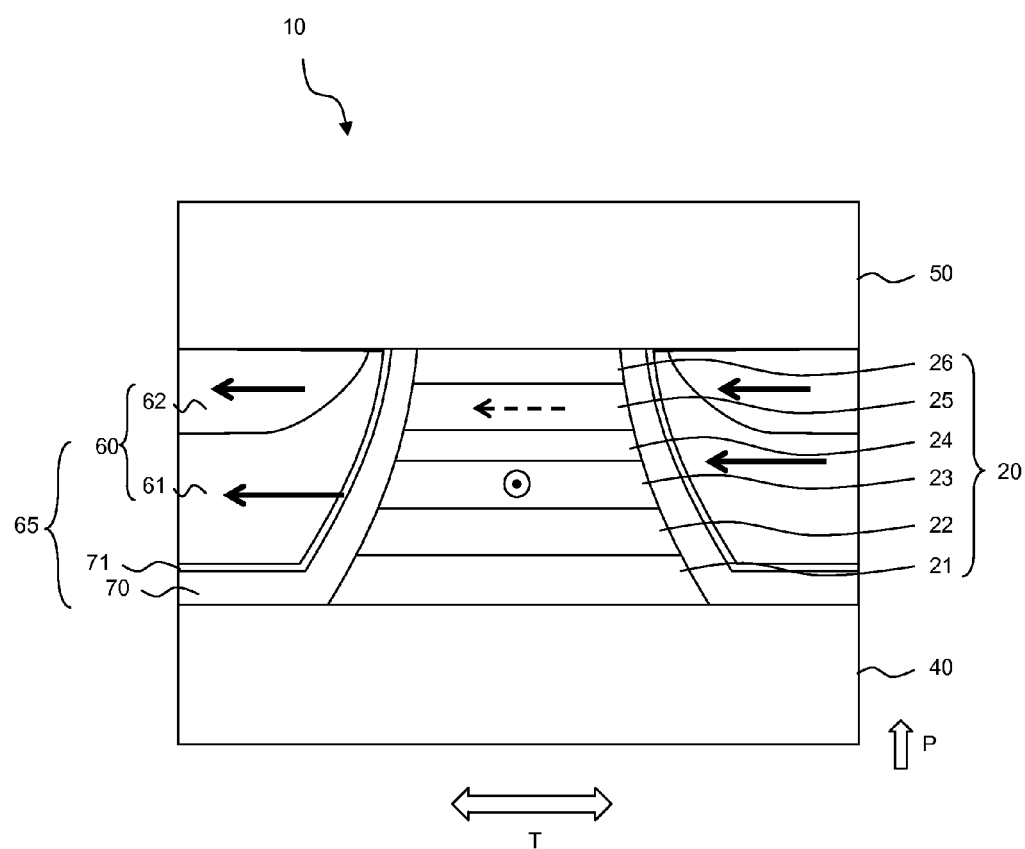
FIG. 5 is a schematic plan view of a reproducing element of a thin film magnetic head with respect to the forth embodiment.

FIG. 5 is a schematic plan view of the reproducing element 10 of the thin film magnetic head 1 with respect to the forth embodiment, viewed from the ABS 110. In this embodiment, each of the bias magnetic field application layers 60 has the soft magnetic layer 61 and a hard magnetic layer 62 disposed to contact the soft magnetic layer 61. The soft magnetic layer 61 is positioned further from the upper shield layer 50 than the hard magnetic layer 62 and closer to the magnetization free layer 21 and the magnetization pinned layer 23 than the hard magnetic layer 62.

The hard magnetic layer 62 is magnetized in the track width direction T. As the hard magnetic layer 62, for example, CoPt, FePt or CoCrPt can be used. The coercive force of the hard magnetic layer 62 is high. Therefore, the magnetization direction of the hard magnetic layer 62 hardly changes even when the magnetic field is applied while the thin film magnetic head is used.

The soft magnetic layer 61 magnetically connects to the hard magnetic layer 62 and is magnetized in the direction parallel to the hard magnetic layer 62. As the soft magnetic layer 61, for example, NiFe, CoFe, NiCoFe or the multiple layers combining two or more of them can be used. The soft magnetic layer has a function to absorb magnetic fields. Therefore, the magnetic field applied to both sides of the SV film 20 in the track width direction is effectively absorbed by the soft magnetic layer 61. Especially, the soft magnetic layer 61 is positioned close to the magnetization free layer 21, so that the magnetic field of both sides of the magnetization free layer 21 in the track width direction T is effectively shielded.

The soft magnetic layer 61 is magnetized in the track width direction T by the hard magnetic layer 62. Thereby, the soft magnetic layer 61 gets a function to apply the bias magnetic field to the SV film 20, especially to the magnetization free layer 25. The hard magnetic layer 62 also applies the bias magnetic field to the magnetization free layer 25. In order to more effectively apply the bias magnetic field to the SV film 20, it is preferable that the film thickness of the soft magnetic layer 61 is larger than that of the hard magnetic layer 62.

Fifth Embodiment

Figure 6:
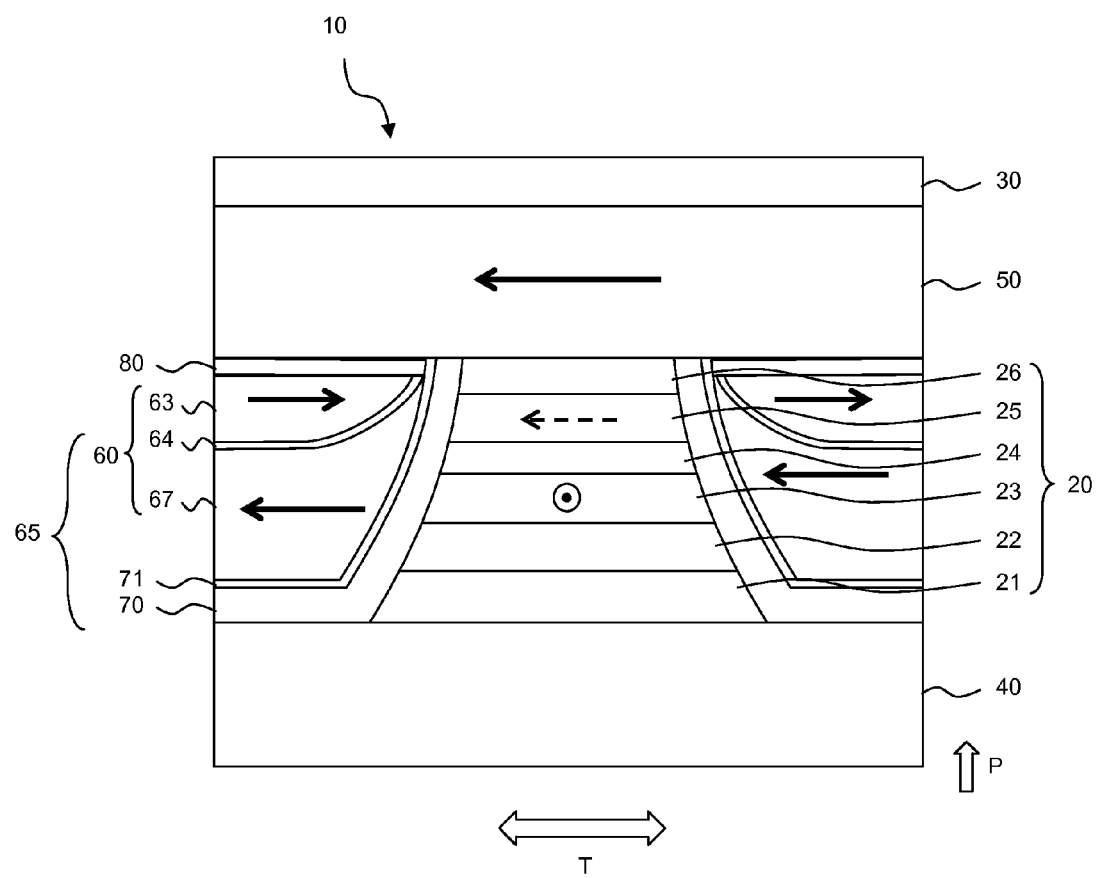
FIG. 6 is a schematic plan view of a reproducing element of a thin film magnetic head with respect to the fifth embodiment.

FIG. 6 is a schematic plan view of the reproducing element 10 of the thin film magnetic head 1 with respect to the fifth embodiment, viewed from the ABS 110. In this embodiment, each of the bias magnetic field application layers 60 has a magnetic coupling layer 64 and two soft magnetic layers exchange-coupled via the magnetic coupling layer 64. The two soft magnetic layers are first and second soft magnetic layers 63 and 67. The second soft magnetic layer 67 is positioned further from the upper shield layer 50 than the first soft magnetic layer 63 and closer to the magnetization free layer 25 and the magnetization pinned layer 23 than the first soft magnetic layer 63. The first soft magnetic layer 63 of the bias magnetic field application layer 60 exchange-couples with the upper shield layer 50 via the magnetic coupling layer 80. The magnetic coupling layers 64 and 80 are made with a nonmagnetic layer of, for example, Ru, Rh, Cr, Cu, Ag or the like.

The first and second soft magnetic layers 63 and 67 may be a single-layer film of NiFe or a lamination film of NiFe and CoFe. When the lamination film is used, the bias magnetic field application layer 60 has a configuration that a NiFe layer, a CoFe layer, a Ru layer (magnetic coupling layer 64), a CoFe layer, a NiFe layer, and a Ru layer (magnetic coupling layer 80) are sequentially laminated on the gap layer 70 in this order. Three or more soft magnetic layers may be provided. A configuration in which a multilayer film [a NiFe layer, a CoFe layer, a Ru layer (a magnetic coupling layer 80), and a CoFe layer] is laminated arbitrary times on the gap layer 70, and a NiFe layer and a Ru layer (magnetic coupling layer 80) is disposed on the multilayer film. Also, a CoFe layer can be omitted, and a configuration is also applicable in which arbitrary numbers of Ru layers (magnetic coupling layer 64) are inserted to a NiFe layer sandwiched between the gap layer 70 and the magnetic coupling layer 80. Between the second soft magnetic layer 67 and the gap layer 70, a seed layer may be disposed. The seed layer is formed by laminating or alloying one, two or more materials selected from, for example, Ta, Ru, Hf, Nb, Zr, Ti, Mo, Cr and W. Other configurations are same as the first embodiment.

The second soft magnetic layer 67 exchange-couples with the first soft magnetic layer 63. Therefore, the second soft magnetic layer 67 is magnetized in the direction antiparallel to the magnetization direction of the first soft magnetic layer 63. However, the second soft magnetic layer 67 is positioned closer to the magnetization free layer 25 than the first soft magnetic layer 63. Therefore, the second soft magnetic layer 67 effectively applies the bias magnetic field to the magnetization free layer 25. In order to more effectively apply the bias magnetic field to the SV film 20, it is preferable that the film thickness of the second soft magnetic layer 67 is larger than that of the first soft magnetic layer 63. Also, the bias magnetic field application layer 60 includes a soft magnetic layer. Therefore, the magnetic field applied to the both sides of the SV film 20 in the track width direction T is effectively shielded.

Sixth Embodiment

Figure 7:
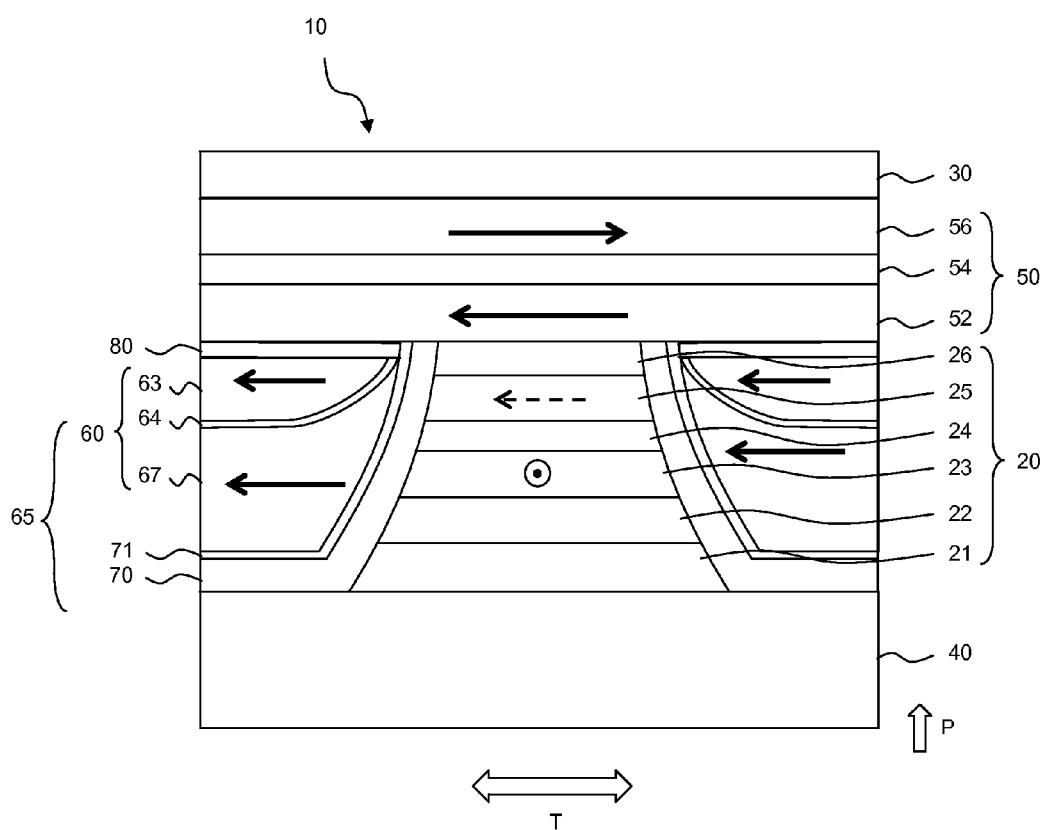
FIG. 7 is a schematic plan view of a reproducing element of a thin film magnetic head with respect to the sixth embodiment.

FIG. 7 is a schematic plan view of the reproducing element 10 of the thin film magnetic head 1 with respect to the sixth embodiment, viewed from the ABS 110. In this embodiment, same as the second embodiment, the upper shield layer 50 is made with the magnetic coupling layer 54 and two soft magnetic layers. The two soft magnetic layers are the first and second soft magnetic layers 52 and 56. The configuration of the upper shield layer 50 is same as the second embodiment, and the configuration of the bias magnetic field application layer 60 is same as the fifth embodiment.

In addition to the embodiments explained above, any configuration of the bias magnetic field application layer 60 in the first through sixth embodiments can be combined with the configuration of the upper shield layer 50 in the first or the second embodiment.

The reproducing element 10 explained above can be manufactured by the steps of the outline below. FIGS. 8A-8D are schematic step views to show the manufacturing method of the reproducing element in the first embodiment as an example. The right side of each of the figures shows a plan view viewed from the lamination direction P, and the left side of each of the figures shows a side view viewed in the orientation of the arrows of the figure on the right side.

Figure 8A:
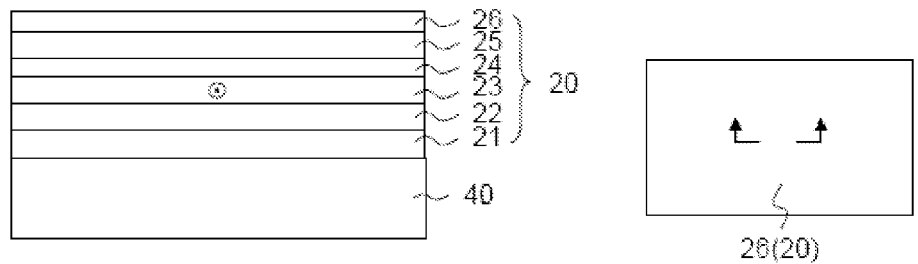
FIGS. 8A-8D are schematic views of manufacturing steps of a reading part of a thin film magnetic head with respect to the first embodiment.

At first, as showed in FIG. 8A, the lower shield layer 40 is formed on the wafer (not shown) by a plating method. On top of it, the SV film 20 made with the buffer layer 21—the cap layer 26 is formed by sputtering. The SV film 20 is formed on the almost entire surface of the lower shield layer 40. After the film formation, an annealing treatment is performed to magnetize the magnetization pinned layer 23. As an example, while a predetermined magnetic field is applied in the height direction H, the wafer is heated at a high temperature about 270° C., and then it is cooled off. By this process, the magnetization pinned layer 23 exchange-coupled with the pinning layer 22 is magnetized in the height direction H. The magnetization pinned layer 23 may be a lamination film in which multiple magnetic layers are laminated sandwiching the antiferromagnetic exchange coupling layer.

Figure 8B:
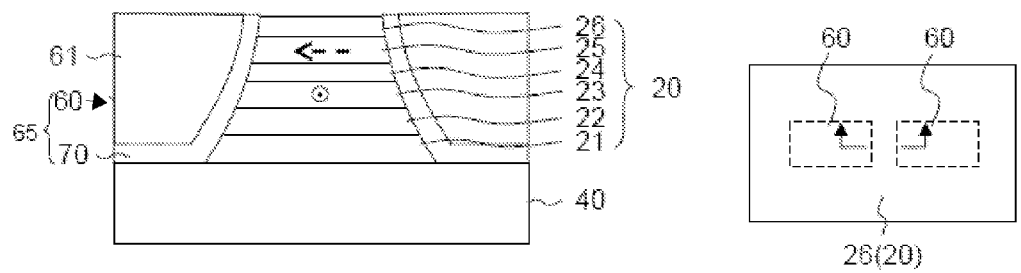

Next, as shown in FIG. 8B, the dimension in the track width direction of the SV film 20 is formed, and the bias magnetic field application layers 60 and the gap layers 70 (side layers 65) are also formed. Specifically, after the patterned resist (not illustrated) is formed on the SV film 20, the SV film 20 exposed from the resist is removed. Thereby, the SV film 20 is formed so as to have a predetermined dimension in the track width direction. In the concavities obtained after removing the SV film 20, the gap layers 70 and the bias magnetic field application layers 60 are formed in this order. Though the illustration is omitted, the seed layers 71 may be disposed between the gap layers 70 and the bias magnetic field application layers 60. The side surfaces of the SV film 20 inclines with respect to the lamination direction. Therefore, the gap layers 70 and the bias magnetic field application layers 60 are certainly formed at the side surfaces of the SV film 20. After that, the resist is removed.

Figure 8C:
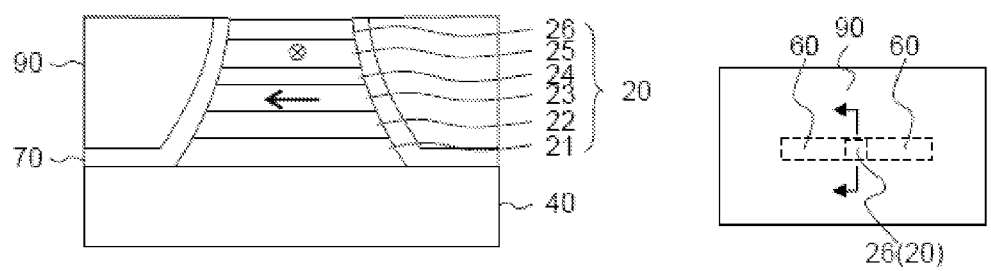

Next, as showed in FIG. 8C, the dimension in the height direction of the SV film 20 is formed. Specifically, after the patterned resist (not illustrated) is filmed on the CV film 20 and the bias magnetic field application layers 60, the SV film 20 and the bias magnetic field application layers 60 are removed to leave respective parts of them so as to make the SV film 20 have a predetermined dimension in the height direction. The remaining SV film 20 and the remaining periphery of the bias magnetic field application layers 60 are filled with an insulation layer 90.

Figure 8D:
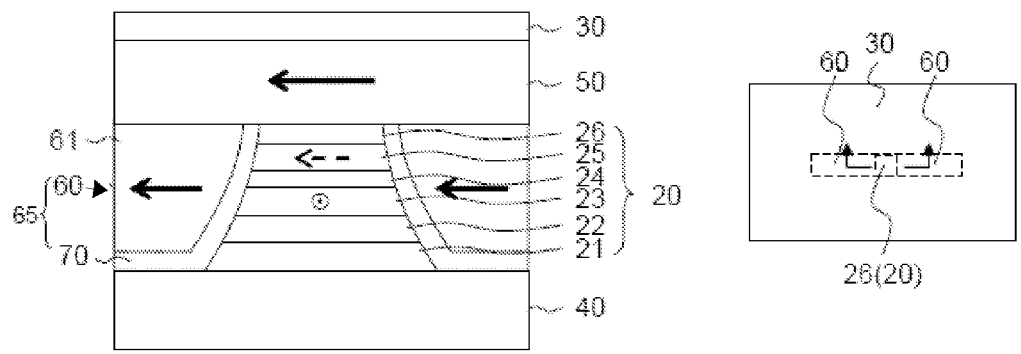

Next, as illustrated in FIG. 8D, on the SV film 20, the bias magnetic field application layers 60 and the insulation layer 90, the upper shield layer 50 and the anisotropy application layer 30 are formed by a spattering method. After that, an annealing treatment is performed to magnetize the upper shield layer 50. As an example, while a predetermined magnetic field is applied to the track width direction T, the wafer is heated at a high temperature about 230° C., and then it is cooled off. By this process, the upper shield layer 50 exchange-coupled with the anisotropy application layer 30 is magnetized in the track width direction T. An annealing temperature is set to be less than the blocking temperature of the pinning layer 22. Therefore, the magnetization condition of the pinning layer 22 and the magnetization pinned layer 23 is not affected heavily.

Thereafter, the writing element 120 mentioned next is formed. Moreover, the wafer is cut, and a thin film magnetic head slider on which the thin film magnetic head is mounted is obtained. In these processes also, the wafer is exposed under a high temperature by cutting or annealing.

Next, referring FIG. 1, a configuration of the writing element 120 is explained. The configuration of the writing element 120 is in common with various embodiments mentioned above. The writing element 120 is disposed on the reproducing element 10 via an inter-element shield 126. The writing element 120 has a configuration for so-called perpendicular magnetic recording. A magnetic pole layer for writing is made with a main magnetic pole layer 121 and an auxiliary magnetic pole layer 122. The main magnetic pole layer 121 is formed with FeCo or FeCoNi, etc. and exposed at the ABS 110 in the direction almost perpendicular to the ABS 110. A coil layer 123 extending on a gap layer 124 made with an insulation material winds around the main magnetic pole layer 121, and a magnetic flux is induced to the main magnetic pole layer 121 by the coil layer 123. The auxiliary magnetic pole layer 122 is a magnetic layer magnetically coupled with the main magnetic pole layer 121. The auxiliary magnetic pole layer 122 is a magnetic pole layer that is formed with an alloy made with two or three of Ni, Fe and Co, or the like and has a film thickness of about 0.01 μm to about 0.5 μm. The auxiliary magnetic pole layer 122 is disposed to branch from the main magnetic pole layer 121 and faces the main magnetic pole layer 121 via the gap layer 124 and the coil insulation layer 125 at the ABS 110 side.

Next, the method to stabilize the magnetization direction of the magnetization pinned layer 23 even after the exposure to the high temperature environment such as an annealing, is mentioned. The magnetization direction of the magnetization pinned layer 23 is pinned in the height direction H by the pinning layer 22. According to the present invention, the magnetization pinned layer 23 receives the compression stress in the track width direction T from the side layers 65 (the whole of the bias magnetic field application layer 60 and the gap layer 70) so as to stretch (transform) in the height direction H. The magnetization pinned layer 23 has a positive magnetostriction coefficient. Therefore, the magnetic field in the height direction H is induced by the inverse magnetostriction phenomenon with respect to such an stretch (transformation) in the height direction H, and the magnetization direction of the magnetization pinned layer 23 is stabilized to the height direction H.

In order to keep the magnetization pinned layer 23 in the compression stress state in the track width direction T, it is important that the side layers adjacent to the magnetization pinned layer 23 has compression stress in the track width direction T. Especially, in the manufacturing process of the head, the thin film magnetic head receives various annealing treatments, so it is important that, even after the annealing, the side layers maintain the compression stress, favorably a high compression stress.

When a soft magnetic layer is put under the high temperature environment after the film formation, the stress of the soft magnetic layer usually changes toward the tensile stress. By adjusting the film formation condition, it is possible to obtain the compression stress after the film formation. However, after the soft magnetic layer is put under the high temperature environment, the compression stress is relaxed and often changed into the tensile stress. The stress state of the hard magnetic body of CoPt and the like used as a conventional bias magnetic field application layer does not change even under the exposure to the high temperature environment of an annealing treatment and the like. Therefore, when the compression stress is generated at the time of the film formation, the compression stress state is maintained even after the annealing. On the other hand, when the bias magnetic field application layer including the soft magnetic layer is used, it is difficult to maintain the compression stress after the annealing. In the following, the method to prevent the compression stress of the side layer including the soft magnetic layer from relaxing after the annealing and to stabilize the magnetization direction of the magnetization pinned layer is mentioned. Here, the soft magnetic layer means the soft magnetic layer 61 in the first to fourth embodiments and the first and second soft magnetic layers 63 and 67 in the fifth and sixth embodiments.

The first method is to choose the material of the gap layer 70 so that, even after the annealing, the side layer 65 has the compression stress at least in the vicinity of the magnetization pinned layer 23, favorably at the side, or at a position to contact the magnetization pinned layer 23, or so that, even after the annealing, the relaxation of the compression stress of the side layer 65 is prevented. From this point of view, the gap layer 70 is preferably made with a MgO layer. The side layer 65 may have a Ta film or a Ru film as the seed layer 71, or both a Ta film and a Ru film, between the MgO gap layer 70 and the bias magnetic field application layer 60.

Table 1 shows the measurement result of the stress generated in the side layer when $Al_2O_3$ or MgO is used as the gap layer. In the film configuration column of the table, the left side shows the gap layer and the right side shows the bias magnetic field application layer, and the numbers shows the thicknesses of the layers. The film thickness of the gap layer is 5 nm, and the film thickness of the bias magnetic field application layer is 18 nm. The tensile stress shows as a positive number, and the compression stress shows as a negative number. The annealing treatment is performed at 225° C. for three hours. Sample 1 is an example of a conventional bias magnetic field application layer using a hard magnetic layer (CoPt). A high compression stress is obtained at the time of the film formation, the stress change is little after the annealing, and the high compression stress is maintained.

Samples 2-5 are examples using $Al_2O_3$ as the gap layer and NiFe as the bias magnetic field application layer. With respect to Sample 2, by changing the film formation condition of NiFe, it is possible to obtain a high compression stress at the time of the film formation (Samples 3-5). However, after the annealing, the stress change is large, and after the annealing, the stresses changed into the tensile stress in all samples. Sample 6 is an example using MgO as the gap layer and NiFe as the bias magnetic field application layer. The stress change between before and after the annealing is small, and even after the annealing, the compression stress is maintained. From the above, it is understood that, when the bias magnetic field application layer made with a soft magnetic layer is used, the side layer maintains a compression stress by forming a gap layer with MgO.

TABLE 1

| Sample | Film Configuration (nm) | Stress at the time of film formation (MPa) | Stress after the annealing (MPa) | Change of Stress (MPa) |
|---|---|---|---|---|
| 1 | $Al_2O_3$5/CoPt18 | −659 | −532 | 127 |
| 2 | $Al_2O_3$5/NiFe18 | −80 | 251 | 331 |
| 3 | $Al_2O_3$5/NiFe18 | −306 | 365 | 671 |
| 4 | $Al_2O_3$5/NiFe18 | −551 | 220 | 731 |
| 5 | $Al_2O_3$5/NiFe18 | −753 | 85 | 838 |
| 6 | MgO5/NiFe18 | −321 | −50 | 271 |

The second method is to configure a bias magnetic field application layer so that a side layer has a compression stress even after annealing at least in the vicinity of a magnetization pinned layer, preferably at a side of that, or at a position to contact a magnetization pinned layer. The second method is classified into a method to adjust the composition and the crystal structure of a soft magnetic layer of a bias magnetic field application layer (No.1 and No.2) and a method to insert another insert layer to a soft magnetic layer (No.3 and No.4). According to these methods, a MgO gap layer as mentioned in the first method is not needed. In order to obtain an even larger compression stress, it is also preferable that the first method and the second method are used together. Below, each of the methods is mentioned.

(Second Method (No.1)) In this method, an additional material is added to the soft magnetic layer of the bias magnetic field application layer. As the soft magnetic layer, a material to become an amorphous when film-formation is performed by adding the additional material is used. Table 2 shows the stress at the time of the film formation and the stress after the annealing when film-formation is performed with a single material out of various materials (the thickness of the film is 26 nm and by physical vapor deposition (PVD)). CoFeB of Sample 10 is an amorphous material, and the stress change of the CoFeB into the tensile stress after the annealing is small. Ta of Sample 12 is a material to become an amorphous or a microcrystal, and the compression stress of Ta becomes even larger after the annealing. Therefore, it is conceivable that using a soft magnetic material to become an amorphous or a microcrystal can make the change into the tensile small after the annealing small or make the compression stress large. A soft magnetic material to become an amorphous or a microcrystal is formed by adding one, two or more of Ta, B, Si, Ga, Ge, Zr and Hf to a soft magnetic layer made with one of Co, Fe and Ni, or the combination of two or more of them.

TABLE 2

| Sample | Film Configuration (nm) | Stress at the time of film formation (MPa) | Stress after the annealing (MPa) | Change of Stress (MPa) |
|---|---|---|---|---|
| 7 | $Co_{90}Fe_{10}$26 | 196 | 344 | 148 |
| 8 | Fe26 | 441 | 373 | −68 |
| 9 | $Ni_{96}Fe_4$26 | 167 | 390 | 223 |
| 10 | CoFeB26 | 48 | 178 | 130 |
| 11 | Ru26 | −1142 | −780 | 362 |
| 12 | Ta26 | −1175 | −1352 | −177 |

(Second Method (No.2)) In this method, the bias magnetic field application layer with a body-centered cubic lattice (bcc) structure is used. The bias magnetic field application layer is formed with one of Co, Fe and Ni, or the combination of two or more of them. For example, a soft magnetic material including Fe takes a face-centered cubic lattice (fcc) structure when the content rate of Fe is small. On the other hand, a (Fe rich) soft magnetic material whose content of Fe is large takes a bcc structure. The stress change of a bcc structure after the annealing is small, and the compression stress tends to be maintained even after the annealing. Sample 8 of Table 2 shows one of the examples. As examples of such soft magnetic materials, FeNi that includes 70% or more Fe in atomic fraction and FeCo that includes 20% or more Fe in atomic fraction are given.

(Second Method (No.3)) In this method, an insert layer to be able to become an amorphous or a microcrystal when film formation to form as a single film is performed is inserted to the soft magnetic layer. The insert layer is illustrated in FIG. 2 as the layer 66. The soft magnetic layer can be formed with one of Co, Fe and Ni or the combination of two or more of them. According to Table 3, when the bias magnetic field application layer of NiFe with the film thickness of 26 nm is configured (Sample 13), the stress change after the annealing is large, and the tensile stress is generated after the annealing. On the other hand, inserting a Ta layer with the film thickness of 0.8 nm to the NiFe layer (Sample 14) suppresses the stress change after the annealing and maintains the compression stress even after the annealing. In contrast, when a CoFe layer is inserted instead of the Ta layer (Sample 15), the same amount of the stress change as Sample 13 is generated. Inserting Ta that is an amorphous decreases the relaxation of the stress caused by the annealing. The insert layer is configured as a single layer of Ta layer or by adding at least one additional material selected from B, Si, Ga, Ge, Zr, Hf and Ta to one of Co, Fe and Ni or the combination of two or more of them. A plurality of insert layers can be inserted to the soft magnetic layer. Similar to the first method, the side layer may have a Ta film or a Ru film as the seed layer 71, alternatively both a Ta film and a Ru film between the gap layer and the bias magnetic field application layer. When the insert layer is Ta or a nonmagnetic layer with a lot of additional materials, it is preferable that the film thickness of the insert layer is 1 nm or less not to divide the magnetic coupling of the soft magnetic layers above and below the insert layer.

TABLE 3

| Sample | Film Configuration (nm) | Stress at the time of film formation (MPa) | Stress after the annealing (MPa) | Change of Stress (MPa) | Mismatch |
|---|---|---|---|---|---|
| 13 | NiFe26 | −467 | 247 | 715 | — |
| 14 | NiFe12/Ta0.8/NiFe12 | −419 | −47 | 372 | Not Defined |
| 15 | NiFe12/FeCo/NiFe12 | −546 | 168 | 715 | 0.16 |

(Second Method (No.4)) In this method, the insert layer with a large interatomic spacing mismatch is inserted to the soft magnetic layer. The insert layer is illustrated in FIG. 2 as the layer 66. The soft magnetic layer can be formed with one of Co, Fe and Ni or the combination of two or more of them. The insert layer can be formed with Fe, Nb, Mo, W, Ti, Zr, Ru, Rh or Cr. The interatomic spacing of the insert layer differs by 2.5% or more, preferably 5% or more, or more preferably 7.5% or more with respect to the interatomic spacing of the soft magnetic layer. This difference of the interatomic spacing, that is, the mismatch, is defined as (B−A)/A×100(%) assuming the interatomic spacing of the soft magnetic layer as A and the interatomic spacing of the insert layer as B. When the insert layer is a nonmagnetic layer, the film thickness of the insert layer is preferably 1 nm or less not to divide the magnetic coupling of the soft magnetic layers above and below the insert layer.

Table 4 shows the stress of the side layer at the time of the film formation and the stress after the annealing when a Fe insert layer is inserted to the soft magnetic layer. According to Table 4, compared to the case when the bias magnetic field application layer is configured with NiFe with the film thickness of 26 nm (Sample 16), when a Fe layer with the film thickness of 0.8 nm is inserted (Sample 17), the stress change before and after the annealing is suppressed. According to Samples 13, 15, 16 and 17 in Tables 3 and 4, it is understood that the stress changes before and after the annealing and the mismatch of the interatomic spacing have a correlative relation. It is expected that the lattice distortion and the defect number inside the soft magnetic layer increase by inserting materials with a large interatomic spacing mismatch. It is understood that frequent existence of the lattice distortions and the defects decreases the relaxation of the stress after the annealing (the change into the tensile stress).

TABLE 4

| Sample | Film Configuration (nm) | Stress at the time of film formation (MPa) | Stress after the annealing (MPa) | Change of Stress (MPa) | Mismatch |
|---|---|---|---|---|---|
| 16 | Ta2/Ni$_{96}$Fe$_4$26 | 77 | 132 | 209 | — |
| 17 | Ta2/Ni$_{96}$Fe$_4$12/Fe0.8/Ni$_{96}$Fe$_4$12 | 52 | 208 | 156 | 6.6 |

Next, the magnetic head slider on which the above-described thin film magnetic head is mounted, the head gimbal assembly and the hard disk device are explained.

Figure 9:
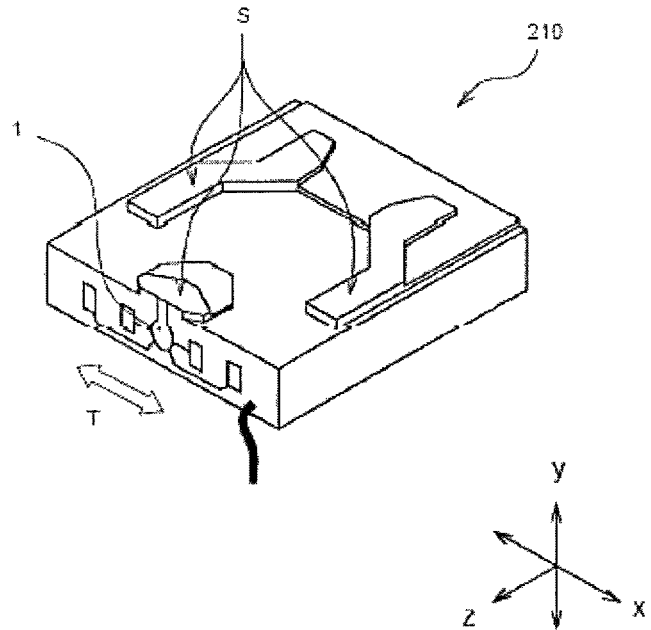
FIG. 9 is a perspective view of a slider in the present invention.

Referring to FIG. 9, a thin film magnetic head slider 210 has an almost hexahedron shape and one of the surfaces is the ABS 110 facing a hard disk.

Figure 10:
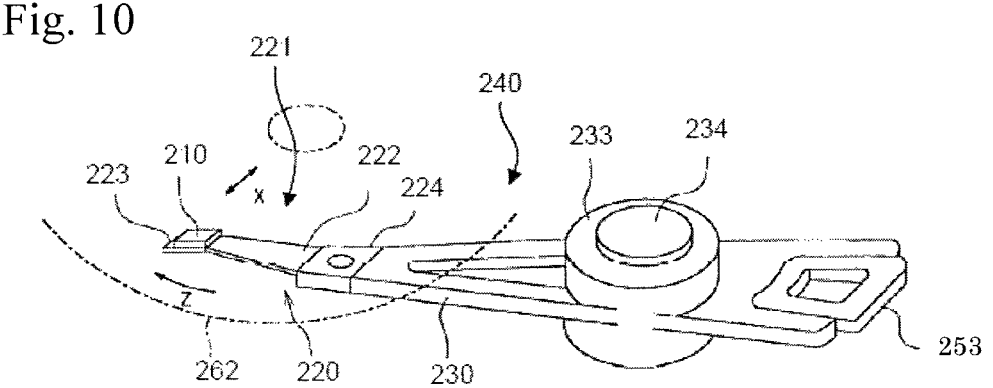
FIG. 10 is a perspective view of a head arm assembly including a head gimbal assembly in which the slider is incorporated in the present invention.

Referring FIG. 10, a head gimbal assembly 220 is provided with the thin film magnetic head slider 210 and a suspension 221 to elastically support the thin film magnetic head slider 210. The suspension 221 has a load beam 222 with a leaf spring shape formed with stainless steel, a flexure 223 disposed at an end part of the load beam 222 and a base plate 224 disposed on the other side of the load beam 222. The flexure 223 joins to the thin film magnetic head slider 210 and gives the thin film magnetic head slider 210 moderate freedom. At the part of the flexure 223 to install the thin film magnetic head slider 210, a gimbal part is disposed to keep the thin film magnetic head slider 210 in a certain orientation.

The thin film magnetic head slider 210 is arranged in the hard disk device so as to face the hard disk that is a recording medium that is rotatably driven and has a disk-shape. When the hard disk rotates in a z-direction in FIG. 10, the air flow passing through between the hard disk and the thin film magnetic head slider 210 generates lifting force downward in a y-direction on the thin film magnetic head slider 210. The thin film magnetic head slider 210 flies on the surface of the hard disk due to the lifting force.

In the vicinity of an end part of the thin film magnetic head slider 210 on an air outflow side (lower left end part in FIG. 9), the thin film magnetic head 1 is formed.

The head gimbal assembly 220 attached on an arm 230 is referred to as a head arm assembly 240. The arm 230 makes the thin film magnetic head slider 210 move in a track crossing direction X of the hard disk 262. An end of the arm 230 is attached on the base plate 224. On another end of the arm 230, a coil 231 to become a part of a voice coil motor is attached. At the middle part of the arm 230, a bearing part 233 is disposed. The arm 230 is rotatably supported by a shaft 234 attached on the bearing part 233. The arm 230 and the voice coil motor to drive the arm 230 form an actuator.

Figure 11:
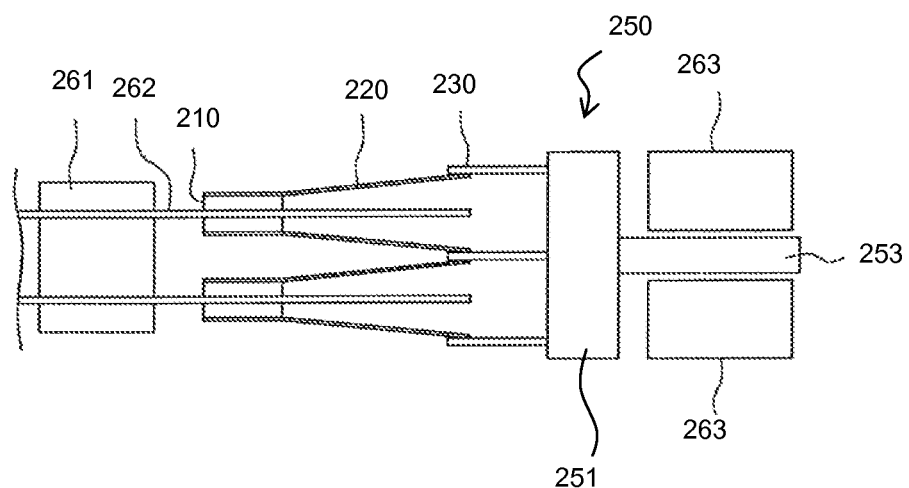
FIG. 11 is a side view of the head arm assembly in which the slider in the present invention is incorporated.
Figure 12:
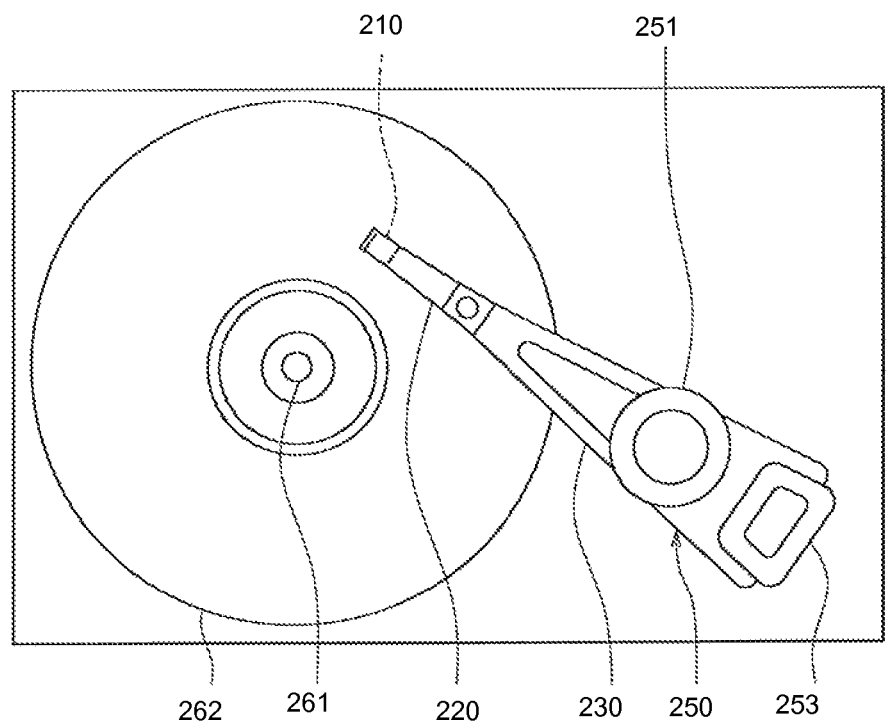
FIG. 12 is a plan view of a hard disk device in which the slider in the present invention is incorporated.

Next, referring to FIGS. 11 and 12, the head stack assembly with which the slider mentioned above is incorporated and the hard disk device are explained. The head stack assembly is formed by attaching the head gimbal assembly 220 on each arm of a carriage, and the carriage has a plurality of arms. FIG. 11 is a side view of the head stack assembly, and FIG. 12 is a plan view of the hard disk device. A head stack assembly 250 has a carriage 251 with the plurality of arms 230. On the arms 230, head gimbal assemblies 220 are attached so as to have the interval with respect to an adjacent head gimbal assembly 220 and line up in the vertical direction. On the side of the carriage 251 that is opposite the arms 230, a coil 253 to become a part of the voice coil motor is attached. The voice coil motor has permanent magnets 263 arranged at positions to sandwich the coil 253 and face each other.

Referring to FIG. 12, the head stack assembly 250 is incorporated with the hard disk device. The hard disk device has multiple numbers of hard disks 262 attached on a spindle motor 261. For each of the hard disks 262, two of the thin film magnetic head sliders 210 are arranged so as to sandwich the hard disks 262 and face each other. The head stack assembly 250 excluding the thin film magnetic head slider 210 and the actuator correspond to a positioning device according to the present invention, and position the thin film magnetic head slider 210 with respect to the hard disks 262 as well as support the thin film magnetic head slider 210. The thin film magnetic head slider 210 is moved by the actuator in the track crossing direction of the hard disks 262 and is positioned with respect to the hard disks 262. The thin film magnetic head 1 included in the thin film magnetic head slider 210 records information on the hard disks 262 by the recording head and reproduces information recorded on the hard disks 262 by the reproducing head.

The preferable embodiment in the present invention is proposed and explained in detail. However, it should be understood that various changes and corrections can be made as far as not from the attached scope of claims and concept.

What is claimed is:

1. A thin film magnetic head, comprising:
   a spin valve film that includes
      a magnetization free layer of which a magnetization direction changes according to an external magnetic field,
      a magnetization pinned layer that has a positive saturation magnetostriction constant and of which a magnetization direction with respect to the external magnetic field is oriented to a direction perpendicular o an air bearing surface, and
      a non-magnetic spacer layer that is disposed between the magnetization free layer and the magnetization pinned layer; and
   a pair of side layers that are disposed at both sides of the spin valve film in a track width direction and at least in the vicinity of the magnetization free layer and the magnetization pinned layer, wherein
   each of the side layers has
      a bias magnetic field application layer that includes a soft magnetic layer and applies a bias magnetic field in the track width direction to the magnetization free layer, and
      a gap layer that is positioned between the spin valve film and the bias magnetic field application layer, wherein the gap layer is made with a MgO layer, and
   the side layers have compression stresses at least in the vicinity of the magnetization pinned layer,
   wherein
   the side layer includes either one of a Ta film and a Ru film or both of the Ta film and the Ru film, being positioned between the gap layer and the bias magnetic field application layer.

2. The thin film magnetic head according to claim 1, further comprising:
   a shield layer that covers the pair of side layers and the spin valve film and that is magnetized in the track width direction, wherein
   the soft magnetic layer has
      a first soft magnetic layer that faces the shield layer, and
      a second soft magnetic layer that is positioned farther from the shield layer than the first soft magnetic layer and closer to the magnetization pinned layer than the first soft magnetic layer,
   the first soft magnetic layer magnetically connects to the shield layer and is magnetized in a direction antiparallel to the shield layer, and
   the second soft magnetic layer magnetically connects to the first soft magnetic layer and is magnetized in a direction antiparallel to the first soft magnetic layer.

3. The thin film magnetic head according to claim 2, wherein
   the pair of bias magnetic field application layers respectively has
      a hard magnetic layer that is magnetized in the track width direction, and
      a soft magnetic layer that magnetically connects to the hard magnetic layer, is magnetized in a direction parallel to the hard magnetic layer, and is positioned closer to the magnetization pinned layer than the hard magnetic layer.

4. A thin film magnetic head, comprising:
   a spin valve film that includes
      a magnetization free layer of which a magnetization direction changes according to an external magnetic field,
      a magnetization pinned layer that has a positive saturation magnetostriction constant and of which a magnetization direction with respect to the external magnetic field is oriented to a direction perpendicular to an air bearing surface, and a non-magnetic spacer layer that is disposed between the magnetization free aye and the magnetization pinned layer; and a pair of side layers that are disposed at both sides of the spin valve film in a track width direction and at least in the vicinity of the magnetization free layer and the magnetization pinned layer, wherein each of the side layers has a bias magnetic field application layer that includes a soft magnetic layer and applies a bias magnetic field in the track width direction to the magnetization free layer, and a gap layer that is positioned between the spin valve film and the bias magnetic field application layer, and the side layers have compression stresses at least in the vicinity of the magnetization pinned layer, wherein the bias magnetic field application layer includes a base material made of one of Co, Fe, and Ni, or a combination of two or more of them, and an additional material that is added to the base material and changes the base material to an amorphous or a microcrystal.

5. The thin film magnetic head according to claim 4, wherein
the additional material is one, two or more of B, Si, Ga, Ge, Zr, Hf, and Ta.

6. A thin film magnetic head, comprising:
a spin valve film that includes
a magnetization free layer of which a magnetization direction changes according to an external magnetic field,
a magnetization pinned layer that has a positive saturation magnetostriction constant and of which a magnetization direction with respect to the external magnetic field is oriented to a direction perpendicular to an air bearing surface, and
a non-magnetic spacer layer that is disposed between the magnetization free layer and the magnetization pinned layer; and
a pair of side layers that are disposed at both sides of the spin valve film in a track width direction and at least in the vicinity of the magnetization free layer and the magnetization pinned layer, wherein
each of the side layers has
a bias magnetic field application layer that includes a soft magnetic layer and applies a bias magnetic field in the track width direction to the magnetization free layer, and
a gap layer that is positioned between the spin valve film and the bias magnetic field application layer, and
the side layers have compression stresses at least in the vicinity of the magnetization pinned layer, wherein
the soft magnetic layer is made of a material of one, two or more of Co, Fe, and Ni,
the bias magnetic field application layer includes at least one insert layer that is inserted to the soft magnetic layer, and
the insert layer is able to become an amorphous or a microcrystal when the insert layer is formed as a single layer.

7. The thin film magnetic head according to claim 6, wherein
the insert layer is made with a Ta single layer or a material in which at least one of B, Si, Ga, Ge, Zr, Hf and Ta is added to one, two or more of Co, Fe, and Ni.

8. The thin film magnetic head according to claim 6, wherein
the side layer includes one of a Ta film and a Ru film or both the Ta film and the Ru film, being positioned between the gap layer and the bias magnetic field application layer.

9. A thin film magnetic head, comprising:
a spin valve film that includes
a magnetization free layer of which a magnetization direction changes according to an external magnetic field,
a magnetization pinned layer that has a positive saturation magnetostriction constant and of which a magnetization direction with respect to the external magnetic field is oriented to a direction perpendicular o an air bearing surface, and
a non-magnetic spacer that is disposed between the magnetization free layer and the magnetization pinned layer; and
a pair of side layers that are disposed at both sides of the spin valve film in a track width direction and at least in the vicinity of the magnetization free layer and the magnetization pinned layer, wherein
each of the side layers has
a bias magnetic field application layer that includes a soft magnetic layer and applies a bias magnetic field in the track width direction o the magnetization free layer, and
a gap layer that is positioned between the spin valve film and the bias magnetic field application layer, and
the side layers have compression stresses at least in the vicinity of the magnetization pinned layer, wherein
the soft magnetic layer is made of a material of one or two or more of Co, Fe, and Ni,
the bias magnetic field application layer includes at least one insert layer inserted to the soft magnetic layer, and
an interatomic spacing of the insert layer differs by 2.5% or more with respect to an interatomic spacing of the soft magnetic layer.

10. The thin film magnetic head according to claim 9, wherein
the interatomic spacing of the insert layer differs 5% or more with respect to the interatomic spacing of the soft magnetic layer.

11. The thin film magnetic head according to claim 9, wherein
the insert layer is made of any of Fe, Nb, Mo, W, Ti, Zr, Ru, Rh, and Cr.

12. A thin film magnetic head, comprising:
a spin valve fill that includes
a magnetization free layer of which a magnetization direction changes according to an external magnetic field,
a magnetization pinned layer that has a positive saturation magnetostriction constant and of which a magnetization direction with respect to the external magnetic field is oriented to a direction perpendicular to an air bearing surface, and
a non-magnetic spacer layer that is disposed between the magnetization free layer and the magnetization pinned layer; and
a pair of side layers that are disposed at both sides of the spin valve film in a track width direction and at least in the vicinity of the magnetization free layer and the magnetization pinned layer, wherein
each of the side layers has
a bias magnetic field application layer that includes a soft magnetic layer and applies a bias magnetic field in the track width direction to the magnetization free layer, and
a gap layer that is positioned between the spin valve film and the bias magnetic field application layer, and the side layers have compression stresses at least in the vicinity of the magnetization pinned layer, further comprising:
a shield layer that covers the pair of side layers and the spin valve film and is magnetized in the track width direction, wherein
the soft magnetic layer magnetically connects to the shield layer and is magnetized in parallel or antiparallel to the shield layer.

13. The thin film magnetic head according to claim 12, wherein
the shield layer has
    a first shield soft magnetic layer that faces the pair of side layers and the spin valve film,
    a second shield soft magnetic layer that is positioned farther from the pair of side layers and the spin valve film than the first shield soft magnetic layer, and that exchange-couples with the first shield soft magnetic layer, and
    a magnetization application layer that is positioned farther from the pair of side layers and the spin valve film than the second shield soft magnetic layer, and that magnetizes the second shield soft magnetic layer in the track width direction,
the first shield soft magnetic layer is magnetized in a direction antiparallel to the second shield soft magnetic layer, and
the soft magnetic layer magnetically connects to the first shield soft magnetic layer.

14. A hard disk device, comprising:
a thin film magnetic head slider that includes
a substrate; and
a thin fill magnetic head formed on the substrate, the thin film magnetic head includes
    a spin valve fill that includes
        a magnetization free layer of which a magnetization direction changes according to an external magnetic field,
        a magnetization pinned layer that has a positive saturation magnetostriction constant and of which a magnetization direction with respect to the external magnetic field is oriented to a direction perpendicular to an air bearing surface, and
        a non-magnetic spacer layer that is disposed between the magnetization aver and the magnetization pinned layer; and
    a pair of side layers that are disposed at both sides of the spin valve film in a track width direction and at least in the vicinity of the magnetization free layer and the magnetization pinned layer, wherein
    each of the side layers has
        a bias magnetic field application layer that includes a soft magnetic layer and applies a bias magnetic field in the track width direction to the magnetization free layer, and
        a gap layer that is positioned between the spin valve film and the bias magnetic field application layer, wherein the gap layer is made with a MgO layer, and
    the side layers have compression stresses at least in the vicinity of the magnetization pinned layer,
    wherein
    the side layer includes either one of a Ta film and a Ru film or both of the Ta film and the Ru film, being positioned between the gap layer and the bias magnetic field application layer;
a recording medium that is positioned facing the thin film magnetic head slider;
a spindle motor that rotatably drives the recording medium; and
a positioning device that supports the thin film magnetic head slider and positions the thin film magnetic head slider with respect to the magnetic recording medium.

15. A thin film magnetic head slider, comprising:
a substrate; and
the thin film magnetic head formed on the substrate, the thin film magnetic head includes
    a spin valve film that includes
        a magnetization free layer of which a magnetization direction changes according to an external magnetic field,
        a magnetization pinned layer that has a positive saturation magnetostriction constant and of which a magnetization direction with respect to the external magnetic field is oriented to a direction perpendicular to an air bearing surface, and
        a non-magnetic spacer layer that is disposed between the magnetization free layer and the magnetization pinned layer; and
    a pair of side layers that are disposed at both sides of the spin valve film in a track width direction and at least in the vicinity of the magnetization free layer and the magnetization pinned layer, wherein
    each of the side layers has
        a bias magnetic field application layer that includes a soft magnetic layer and applies a bias magnetic field in the track width direction to the magnetization free layer, and
        a gap layer that is positioned between the spin valve film and the bias magnetic field application layer, and
    the side layers have compression stresses at least in the vicinity of the magnetization pinned layer, further comprising:
    a shield layer that covers the pair of side layers and the spin valve film and is magnetized in the track width direction, wherein
    the soft magnetic layer magnetically connects to the shield layer and is magnetized in parallel or antiparallel to the shield layer.

* * * * *